United States Patent
Gabrys

(10) Patent No.: US 7,267,028 B2
(45) Date of Patent: Sep. 11, 2007

(54) STACKED DISC FLYWHEEL

(76) Inventor: Christopher W. Gabrys, 900 S. Meadows Pkwy. #3513, Reno, NV (US) 89511

(\*) Notice: Subject to any disclaimer, the term of this patent is extended or adjusted under 35 U.S.C. 154(b) by 993 days.

(21) Appl. No.: 10/148,935

(22) PCT Filed: Oct. 2, 2001

(86) PCT No.: PCT/US01/31106

§ 371 (c)(1),
(2), (4) Date: Aug. 14, 2002

(87) PCT Pub. No.: WO02/29278

PCT Pub. Date: Apr. 11, 2002

(65) Prior Publication Data
US 2003/0029269 A1    Feb. 13, 2003

Related U.S. Application Data

(60) Provisional application No. 60/237,309, filed on Oct. 2, 2000.

(51) Int. Cl.
*G05G 1/00* (2006.01)
*F16F 15/10* (2006.01)

(52) U.S. Cl. .................................. 74/572.11
(58) Field of Classification Search ................ 74/572, 74/573 R, 573 F, 574; 310/74
See application file for complete search history.

(56) References Cited

U.S. PATENT DOCUMENTS

| | | | | |
|---|---|---|---|---|
| 3,775,831 A | * | 12/1973 | Cachat ....................... 148/526 |
| 3,788,162 A | * | 1/1974 | Rabenhorst et al. ........... 74/572 |
| 4,000,665 A | * | 1/1977 | Rabenhorst ................... 74/572 |
| 4,244,240 A | * | 1/1981 | Rabenhorst ................... 74/572 |
| 4,385,845 A | * | 5/1983 | Hoshino ...................... 384/123 |
| 4,538,079 A | * | 8/1985 | Nakayama et al. ........... 310/74 |
| 4,608,874 A | * | 9/1986 | Audren ....................... 74/5.41 |
| 4,629,947 A | * | 12/1986 | Hammerslag et al. ....... 318/161 |
| 5,398,571 A | * | 3/1995 | Lewis ......................... 74/572 |
| 5,590,569 A | * | 1/1997 | Nardone et al. .............. 74/572 |

\* cited by examiner

*Primary Examiner*—Chong H. Kim
(74) *Attorney, Agent, or Firm*—J. Michael Neary

(57) ABSTRACT

A high-speed steel flywheel for a flywheel uninterruptible power is constructed by stacking several unpierced steel discs together. Each disc is heat treated prior to assembly. Thin axial thickness of each disc enables complete rapid quenching to attain a fully hardened condition and development of high tensile strength. The individual discs are machined or ground to shape and assembled to form an axially thicker flywheel capable of storing several kilowatts of energy or more. The discs are attached together by welding, brazing, soldiering, bonding or an interference assembly. The stacked disc configuration minimizes chances of catastrophic failure of the flywheel due to initiation of a crack in a single disc by restricting axial crack propagation to that single disc, and supporting the cracked disc by one or more adjacent discs until the flywheel can be safely decelerated.

23 Claims, 16 Drawing Sheets

STACKED DISC FLYWHEEL

This is related to U.S. Provisional Application 60/237,309 filed on Oct. 2, 2000, and to International Application No. PCT/US01/31106 filed on Oct. 2, 2001. This invention pertains to a high-speed flywheel and more particularly a steel flywheel for a flywheel energy storage system that achieves large energy storage through management of manufacturing limitations and novel construction. The flywheel is particularly well suited for applications that require storage of large amounts of energy from several kilowatt-hours to megawatt-hours

BACKGROUND OF THE INVENTION

Flywheels have been used for many years as energy storage devices. They have often been used as power smoothing mechanisms for internal combustion engines and other kinds of power equipment. More recently, flywheels have been recognized as a very attractive energy storage technology for such electrical applications as uninterruptible power supplies, utility load leveling systems, alternative energy generation, satellites and electric vehicles.

Modern flywheel energy storage systems convert back and forth between a spinning flywheel's rotational energy and electrical energy. A flywheel energy storage system includes a flywheel, a motor and generator, a bearing system and a vacuum enclosure. The rotating flywheel stores the energy mechanically; the motor and generator converts between electrical and mechanical while the bearing system physically supports the rotating flywheel. High-speed flywheels are normally contained in a vacuum or low-pressure enclosure to minimize aerodynamic losses that would occur from atmospheric operation.

Two key advantages of flywheels over electrochemical battery systems are longevity and reliability. Electrochemical batteries, and lead acid batteries in particular, have short lifetimes between two and seven years depending on the operating conditions. These batteries require periodic maintenance, can fail unpredictably and are not environmentally friendly. In contrast, flywheel energy storage systems are expected to have lifetimes of at least 20 years and to require little or no maintenance. Such capability can offset the higher initial costs of the flywheel system over batteries by actually becoming more economical when considered over their life system.

Despite the performance advantages of flywheel systems, to be an economically viable alternative to electrochemical batteries they must be designed to maximize the energy storage capacity while minimizing the cost. Composite material (carbon fiber/epoxy and glass fiber/epoxy) flywheels are actively being pursued as a low cost means of storing kinetic energy. Composites offer the advantages of very high hoop direction strengths. Using recent manufacturing developments, composite flywheels can now also be produced economically. Because composite flywheels develop their strength as the result of bonding together already high strength fibers, they can be made as large as desired with essentially the same strength. However, as a raw material, steel is still much less expensive than composite materials. Unfortunately, problems have existed in efficiently storing large amounts of energy in steel flywheels. Small steel flywheels have successfully been made and rotated to high speeds due to their high strength capability. However, in large steel flywheels, necessary for storing large amounts of energy, on the order of 5-10 kilowatt-hours of energy or more, steel cannot be utilized for a flywheel material as effectively. Although the stresses in large flywheels are the same as stresses in small flywheels spinning with the same peripheral speed, the problem is that the tensile strength of large flywheels is significantly lower. Even with careful selection of the steel and manufacturing process, the strength in a large flywheel can be lower by as much as a factor of two compared to a small flywheel. The phenomenon of lower strength occurring in large steel structures is not unique to flywheels and is common in many applications. However, the loading and other requirements in most applications do not make the lowered strength as problematic.

The strength of steel is directly related to its hardness condition, which results from the internal martensitic concentration in the steel. Hardness in steel is developed and controlled by heat treating of the steel. To gain hardness, the steel is heated to austenizing temperature and then rapidly cooled or quenched. The severity of the quench determines the hardness that the steel will achieve. In thick structures, only the surface can cool at a very high rate while the center material cools slower due to the thermal mass and slow heat transfer rate. Therefore, the larger the steel part and the deeper distance from the surface, the lower the hardness and tensile strength. Beyond a certain depth from the surface, the hardness and strength reaches its lower limit for that type of steel beyond which it does not decrease any further. The ability for a particular type of steel to achieve hardness for a given level of quench severity is known as the steels hardenability. Hardenability is directly related to the percentages of carbon and other alloying elements such as chromium, molybdenum, nickel, etc. Therefore, high alloy steels are usually preferred for large highly stressed parts. The higher hardenability allows the parts to develop a higher strength despite the large part size. It should also be noted that the loading in most structures is primarily bending. The maximum stresses therefore occur at the surfaces of the structure, which inherently corresponds to the highest strength portion of the steel. The depth of hardness in these cases is not a significant issue. After the steel part has been quenched, it is usually too brittle to use, so it is then tempered. Tempering is the process of heating the steel to a temperature lower than austenizing temperature and holding it there for several hours before cooling. The result is some reduction in hardness and tensile strength, but a significant reduction in residual internal stresses and a necessary large increase in toughness are usually gained.

Steel flywheels are unusually stressed structures. For the maximum energy storage density, the flywheel is constructed as a solid cylinder. With this configuration, the radial and hoop direction stresses are both equal and maximum in the center. However, the center is also the place where the steel has the lowest strength, as previously explained by the incapability of obtaining a severe quench at that location. High alloy steels can be used to achieve higher strength at a greater depth from the flywheel surface, but for flywheels greater than several inches in thickness and diameter, the achievable strength at the center and hence energy storage capability is still significantly reduced. For steel flywheels constructed of only 10 inch thickness and diameter, the strength can drop by as much as a factor of two from the surface to the center. The toughness of the steel can also suffer in larger flywheels, because steel that is not fully hardened during quenching cannot be tempered to the highest toughness. High alloy steels and very high alloy tool steels typically utilize oil quenching or even air quenching, which is much less severe than a water quench. An extreme water quench used instead of an oil quench with these steels does not increase the depth of hardening and center strength because the heat transfer rate does not significantly increase after a depth of a few inches below the part surface. The higher quench rate of water with high alloy steels will also generate extreme residual stresses at the surface, possibly cracking the steel round.

On a material cost basis, steels could hold great promise for very low cost energy storage flywheels. In small sizes, steel flywheels currently show exceptional strength and energy storage capability per cost. However, when the flywheel size is increased to store a large amount of energy, the performance unfortunately drops dramatically.

SUMMARY OF THE INVENTION

The invention provides a steel high-speed flywheel for a flywheel uninterruptible power supply that achieves the maximum strength and energy storage capability in large diameter and large thickness flywheels. The flywheel overcomes the previous incapability of heat treating large flywheels to high strength by using a multiple axially stacked layer construction. The flywheel is thus constructed by stacking several steel discs together instead of using a single thick cylinder. Each disc is heat treated (usually austenized, quenched and tempered) prior to being assembled. Because of the thin axial thickness of each layer (typically less than 6 inches and greater than 0.25 inches), the individual layers can be completely quenched at a high rate and are fully hardened. The higher quench rate and martensite composition throughout the flywheel allows for development of high tensile strength. The strength in the flywheel center is as high as that previously only achievable at the flywheel outer diameter. The individual layers or discs are then machined or ground to shape and assembled to form an axially thicker flywheel capable of storing several kilowatts of energy or more. To obtain the maximum benefits of the invention, the discs are unpierced, that is, free of axial through holes. The discs are attached together by welding, brazing, soldiering, bonding or an interference assembly. Once assembled, the complete flywheel can be machined or ground to final dimensions and balanced prior to being installed for service. The flywheel invention has nearly twice the tensile strength of conventional large steel flywheels with unitary construction and is capable of rotating 37% faster and of storing 89% more energy.

DESCRIPTION OF THE DRAWINGS

The invention and its many attendant features and benefits will become better understood upon reading the following description of the preferred embodiments in conjunction with the following drawings, wherein.

DETAILED DESCRIPTION OF THE DETAILED EMBODIMENT

Figure 1:
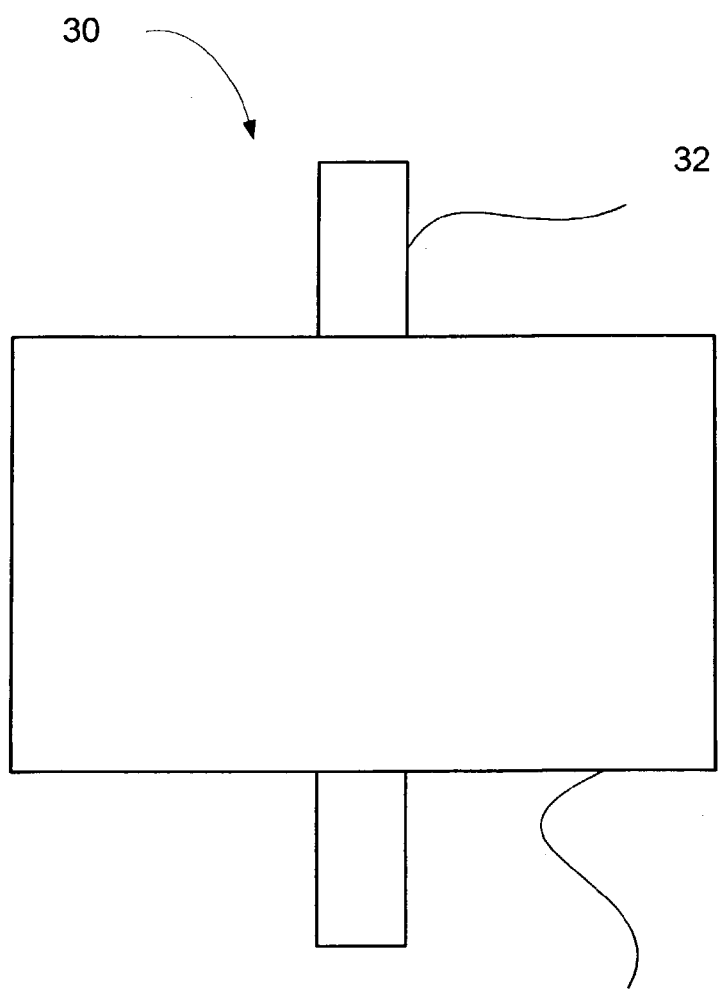
FIG. 1 is an elevation of a solid steel cylinder flywheel.

Turning to the drawings wherein like characters designate identical or corresponding parts, and more particularly to FIG. 1 thereof, a steel flywheel 30 is shown for use in a flywheel energy storage system, not shown. The flywheel 30 consists of a large solid cylinder 31 and in most case, upper and lower shafts 32. If the cylinder section 31 is of a large diameter and thickness (greater than several inches in each dimension), the strength of the steel in the radial center will be significantly lower than its maximum capacity. The radial center is also the position where the flywheel is most highly stressed. The strength in the center will be lower than the strength at the outer diameter surface because of the inability to effectively quench the steel at such a great depth from the flywheel surfaces. A large steel flywheel cannot be rotated to the same peripheral speed as one that is small and therefore cannot store the same amount of energy per weight.

Figure 2:
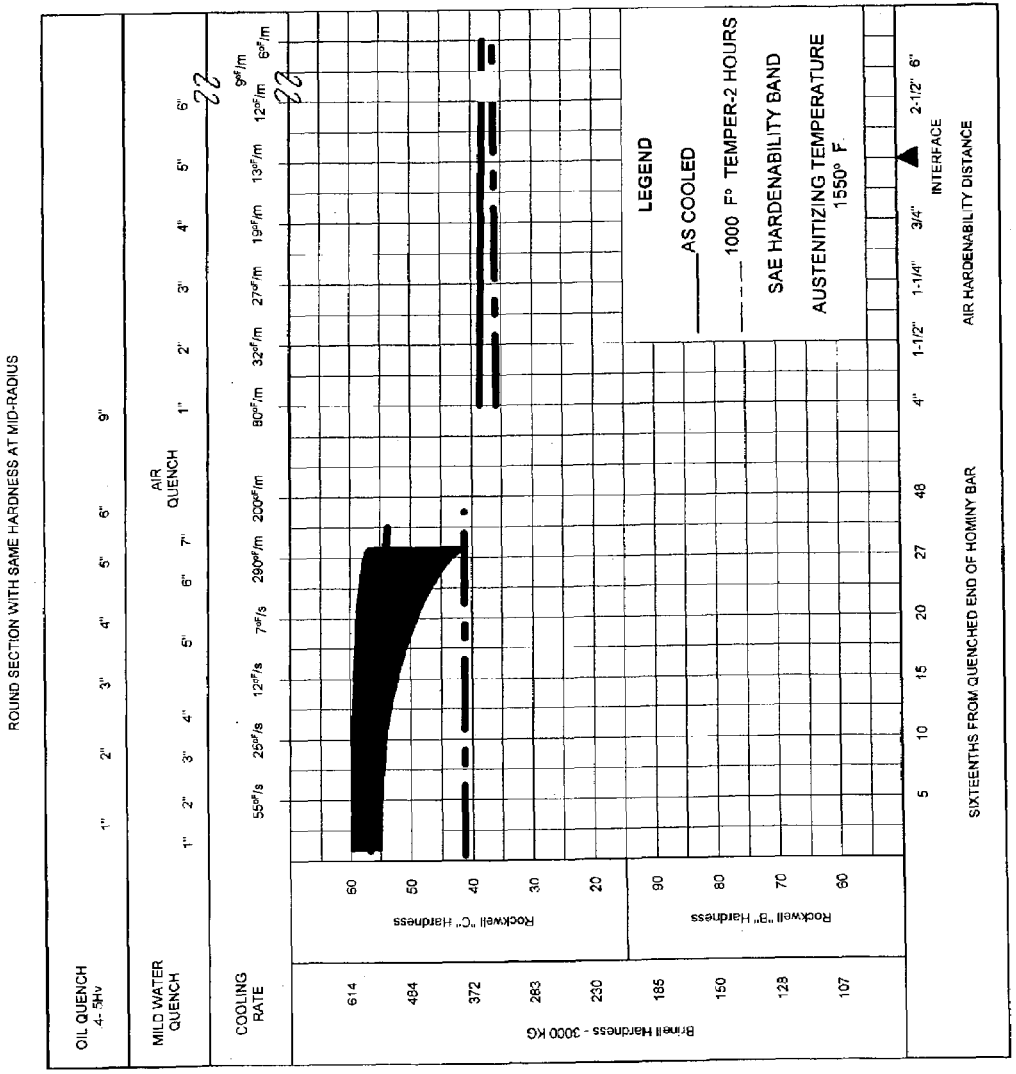
FIG. 2 is a hardenability chart for 4340 steel.

A preferred steel for energy storage flywheels is 4340 alloy steel because of its deeper hardenability at low cost. As shown in the hardenability chart for 4340 alloy steel in FIG. 2, the maximum hardness for small parts is approximately 60 HRC using an oil quench. The maximum hardness attainable decreases with depth for larger parts to about 34 Rockwell C for the center of parts over 9 inch diameter. Steel is usually too brittle to be used directly after quenching and must be tempered to increase its toughness to acceptable levels. The dashed lines show the hardness after a typical 2-hour temper at 1000° F. The hardnesses are reduced to 42 HRC for small sections and 32 HRC for large sections. Although not shown in this chart, a lower temperature temper such as around 400° F. could alternatively be used instead to produce a hardness of about 52 HRC for smaller sections and the same 32 HRC for larger sections. The selection of the tempering temperature results in a tradeoff between the tensile strength and toughness of the steel. Steels other than 4340 could also be used for increased hardenability, such as tool steels, but they are currently about four times more expensive. They also have a limited ability to develop toughness, which can reduce their allowable operating stress depending on the desired number of discharge cycles of the flywheel.

Figure 3:
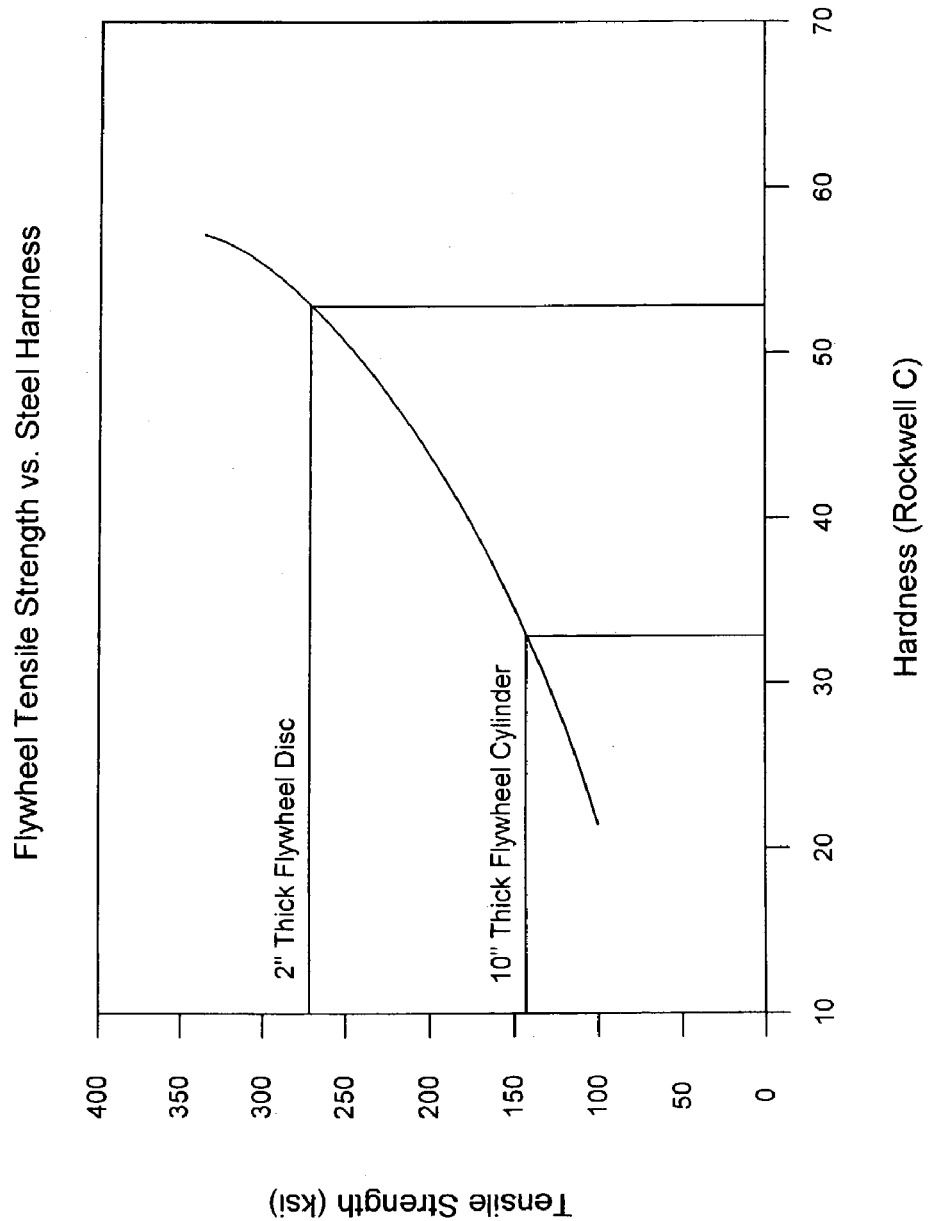
FIG. 3 is a graph showing flywheel tensile strength versus steel hardness.

FIG. 3 shows that the tensile strength is directly related to the hardness of the steel. For a given heat treatment, a 10-inch thick 4340 steel flywheel achieves 32 HRC hardness with approximately 146 ksi tensile strength in the center. If the flywheel is made of a 2-inch thick disc instead, the flywheel achieves 52 HRC hardness with approximately 275-ksi tensile strength in the center. From this graph, it is clear that steel flywheels are preferably constructed from axially thin discs, preferably between ¼ and 2 inches, to achieve high strength. The upper portion of the curve corresponding up to approximately 60 HRC corresponds to untempered steel that is strong but too brittle to be put into service in this condition.

Figure 4:
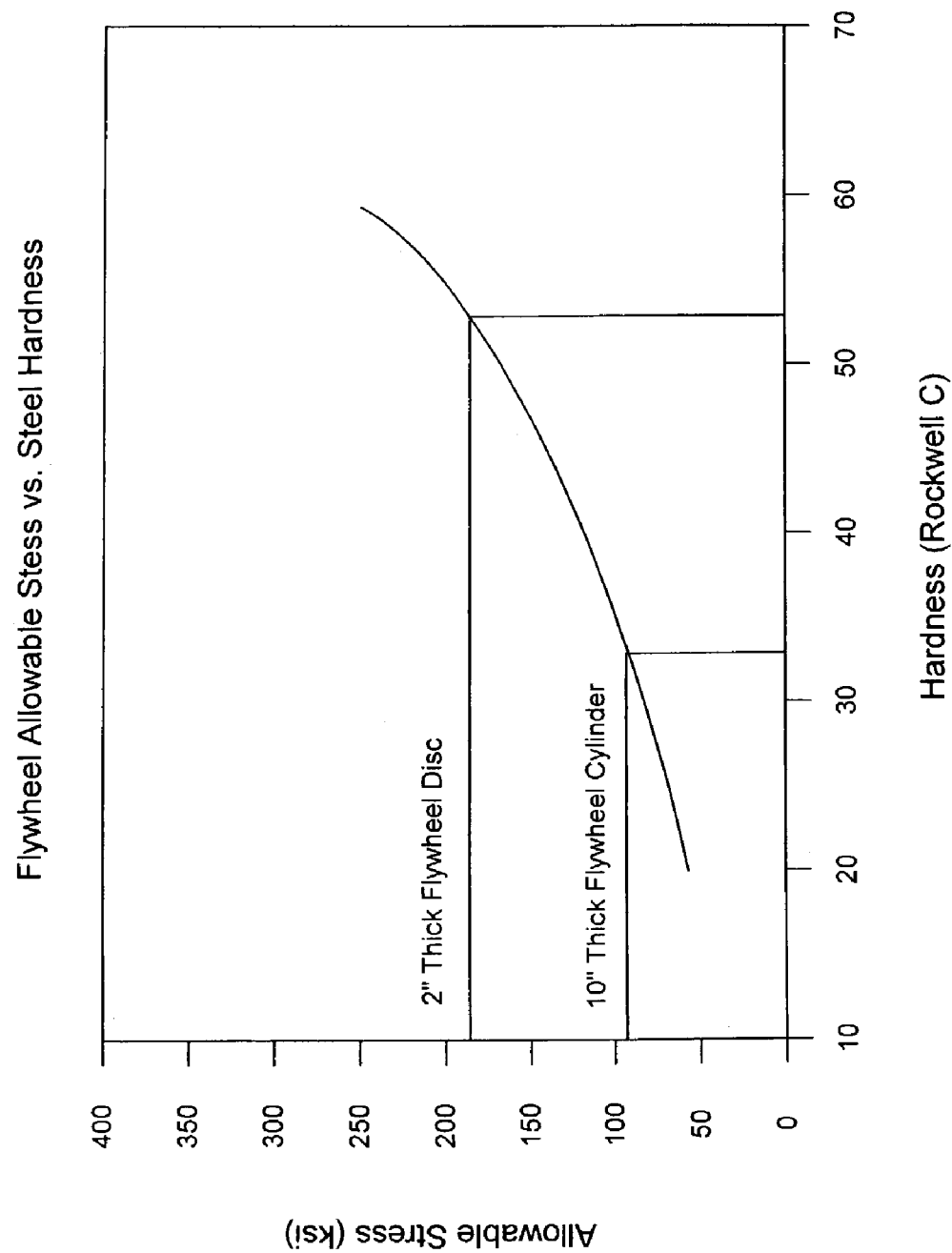
FIG. 4 is a graph shown flywheel allowable stress versus steel hardness.

An example of the allowable stress in the flywheel versus the steel hardness, shown in FIG. 4, uses the tensile strengths from the previous graph, FIG. 3, divided by 1.5. This is a simple approach that gives a factor of safety of 1.5 if the flywheels are rotated once at the allowable stresses indicated. The allowable stress for the 10-inch thick cylinder is approximately 97 ksi while the 2-inch thick disc can operate at approximately 183 ksi. An alternative allowables approach is to apply different factors of safety to the yield stresses instead. The factors of safety are preferably chosen to allow safe operation for more than the entire expected cycle life of the flywheel. Over the service life of a flywheel system, the actual operation will result in a certain number of discharge cycles depending on its application. Using the discharge cycles and depth of discharge information, a more accurate determination of the allowable operating stress can also be made by using fracture mechanics. In this case, the flywheel toughness is also considered along with internal flaw size. The result from this approach may be that the highest allowable operating stress would be achieved by tempering a fully hardened steel flywheel to a lower strength but inherently high toughness condition. For steel flywheels in general, it is preferable to have a tensile yield strength greater than 100 ksi and a simultaneous plane strain fracture toughness above 70 ksi(in)½. Values higher than this would be even more preferable.

Figure 5:
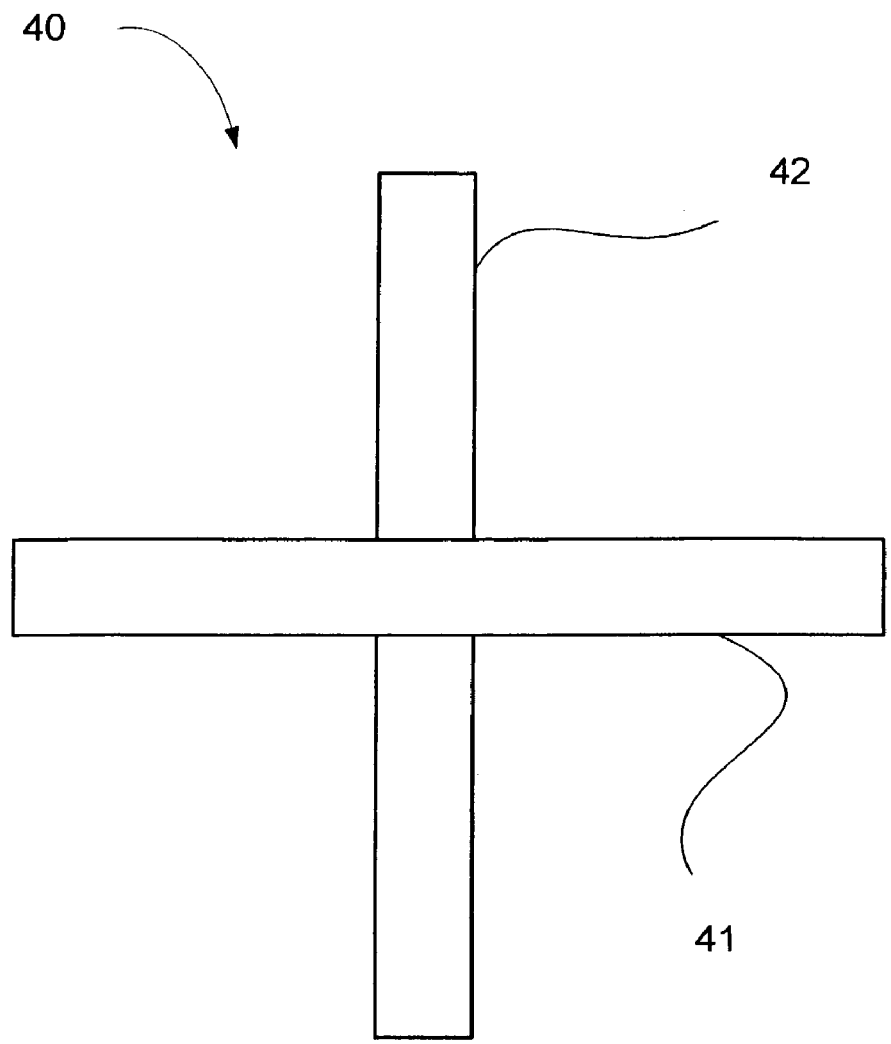
FIG. 5 is an elevation of a solid steel disc flywheel.

A high performance steel disc flywheel 40, shown FIG. 5, can be spun to higher speeds than the cylinder flywheel 30 depicted in FIG. 1. The disc flywheel 40 contains a disc 41 and in most cases, shafts 42. With an axially thinner section, the tensile strength in the flywheel center can be made much higher. Unfortunately, the flywheel cannot store an appreciable amount of energy without the diameter becoming excessively large, and therefore it is not a preferred design for large energy storage applications.

Figure 6:
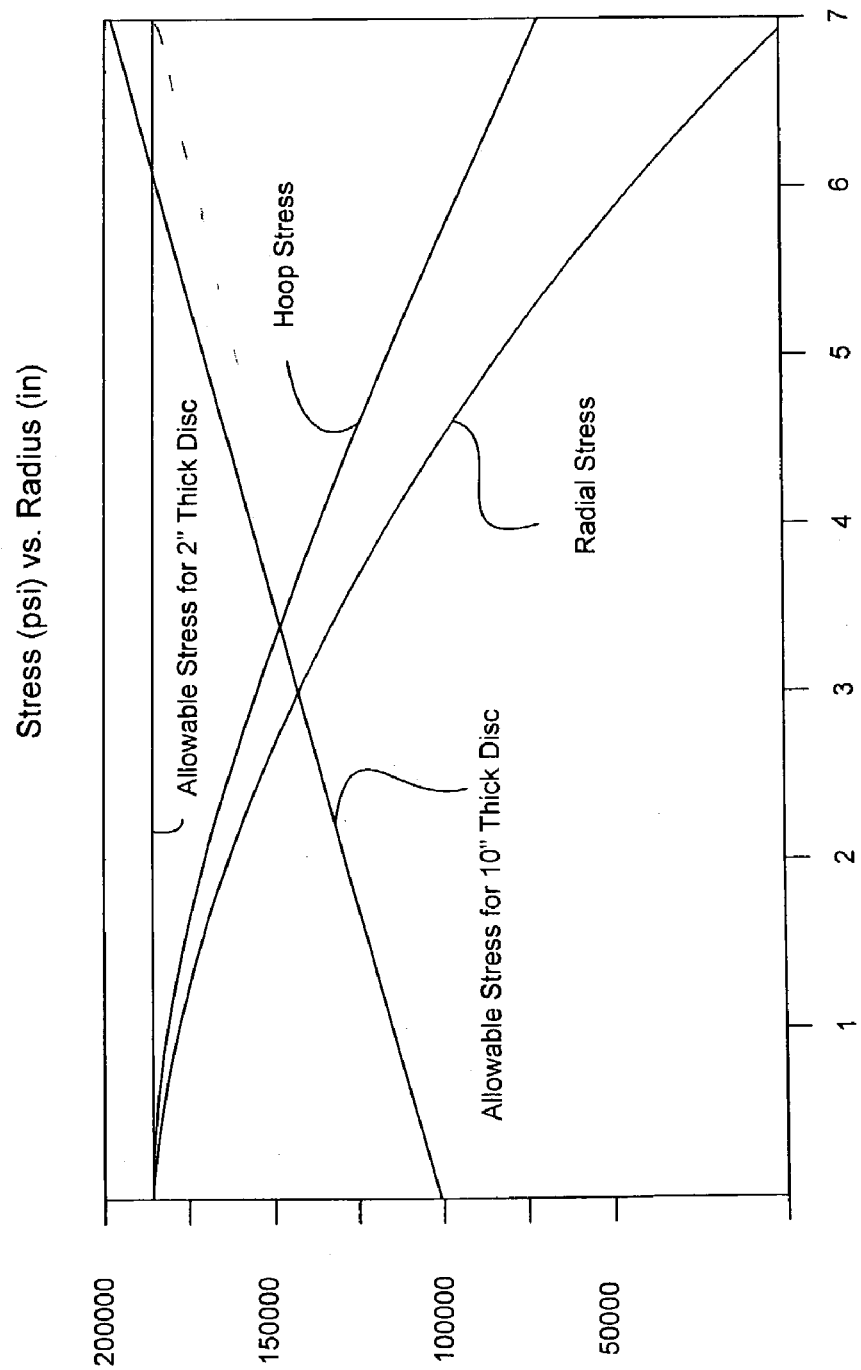
FIG. 6 is a graph showing a stress and strength comparison between a solid steel disc and cylinder flywheels.

As shown in FIG. 6, the radial and hoop stresses of a solid steel disc and cylinder flywheel, with same diameter (>9 inch) and operating at the same tip speed (640 m/sec), are identical. However, the allowable stress for the cylinder drops toward the radial center due to the lower hardness and lower tensile strength. The strength distribution shown is a linear approximation but in actuality, the strength distribution is not quite linear and drops asymptotically to the lower strength shown at the center. The allowable stress for the disc flywheel is constant and equal to the maximum achieved in the cylinder at the outer diameter. This graph further indicates that the use of the disc flywheel is preferred for rotating to higher speed for more effective use of steel to store energy.

Figure 7:
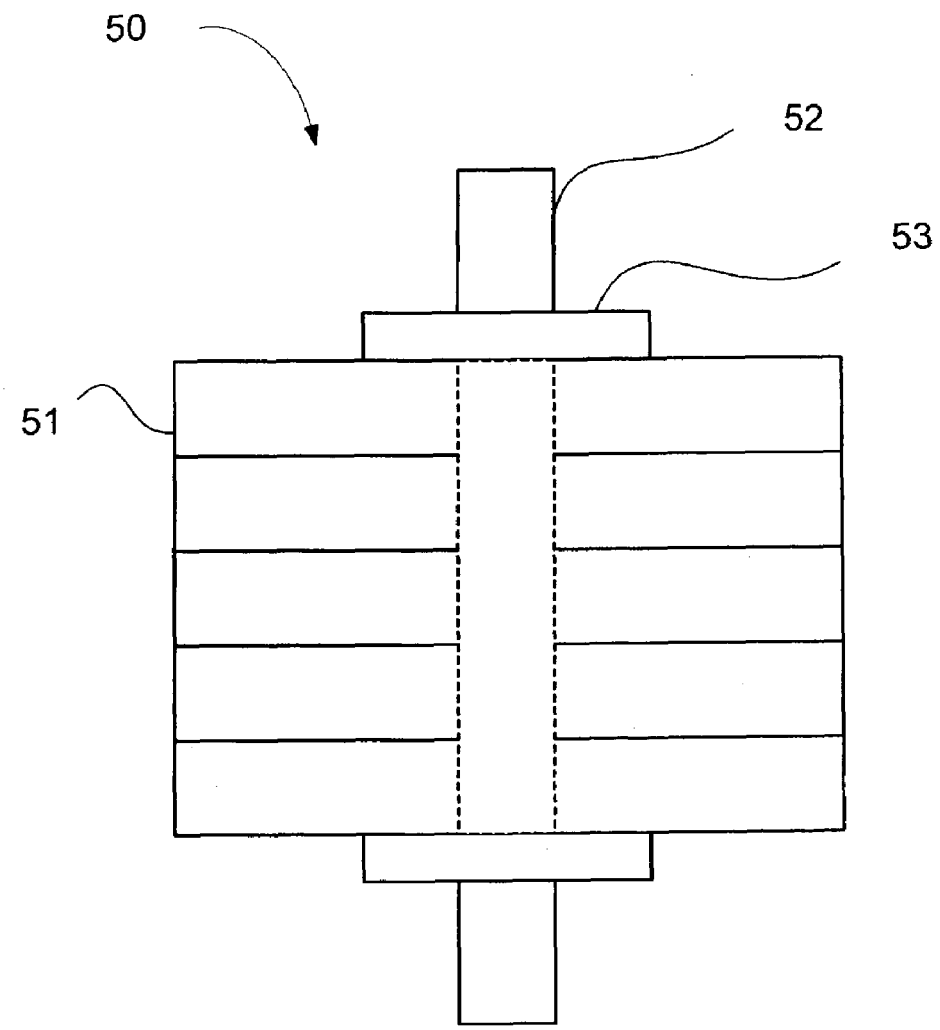
FIG. 7 is an elevation of an axially stacked disc flywheel with a central shaft, not in accordance with the preferred embodiment of the invention.

In order to store a large amount of energy and to simultaneously have effective use of the steel in the flywheel, the flywheel can be constructed by stacking multiple steel discs together. The discs would be quenched prior to assembly. As shown in FIG. 7, an axially stacked flywheel 50 is constructed using multiple thinner discs 51 that are held together using a central shaft 52 and locking plates 53. However, the central shaft 52 pierces the center of the discs 51, so the flywheel 50 is not capable of the same high speed rotation and energy storage that a flywheel free of axial holes would be. As shown in the stress plot of FIG. 8, the configuration of an axially stacked disc flywheel with central shaft as shown in FIG. 7 is undesirable. The stress plots illustrate that the addition of the hole at the center causes the radial stress to become zero at that point but the hoop stress doubles. The hoop stress becomes approximately 366 ksi where it was 183 ksi without the center hole, as shown in FIG. 6. The tip speed is again 640 m/sec.

Figure 8:
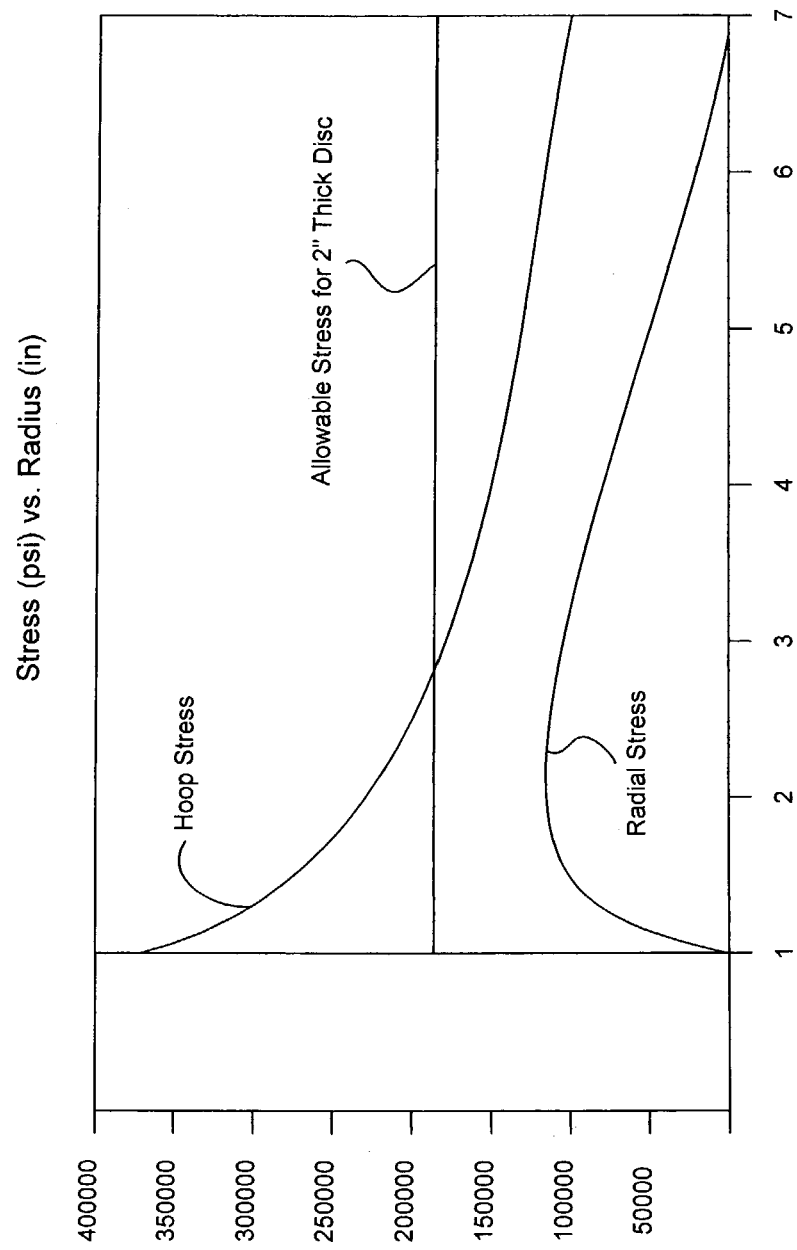
FIG. 8 is a graph showing stresses in an axially stacked disc flywheel with a central shaft, as shown in FIG. 7.
Figure 9:
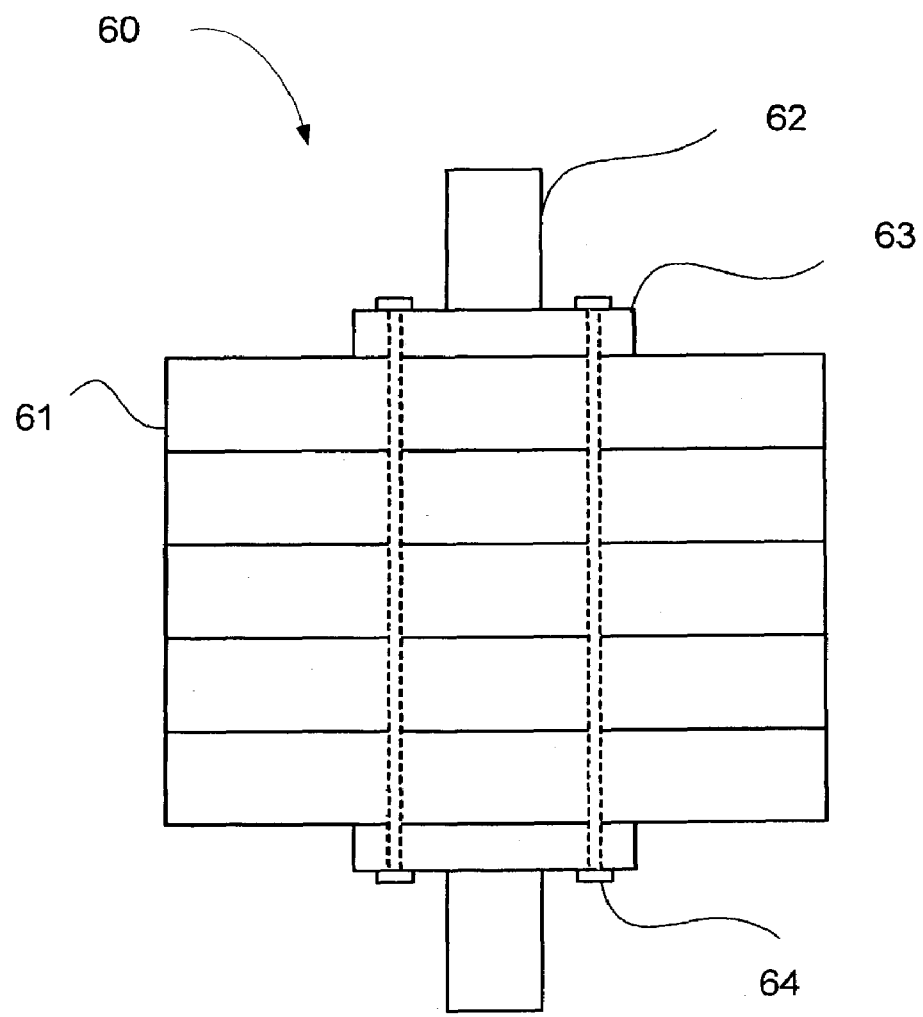
FIG. 9 is an elevation of an axial stacked disc flywheel with axial bolts.
Figure 10:
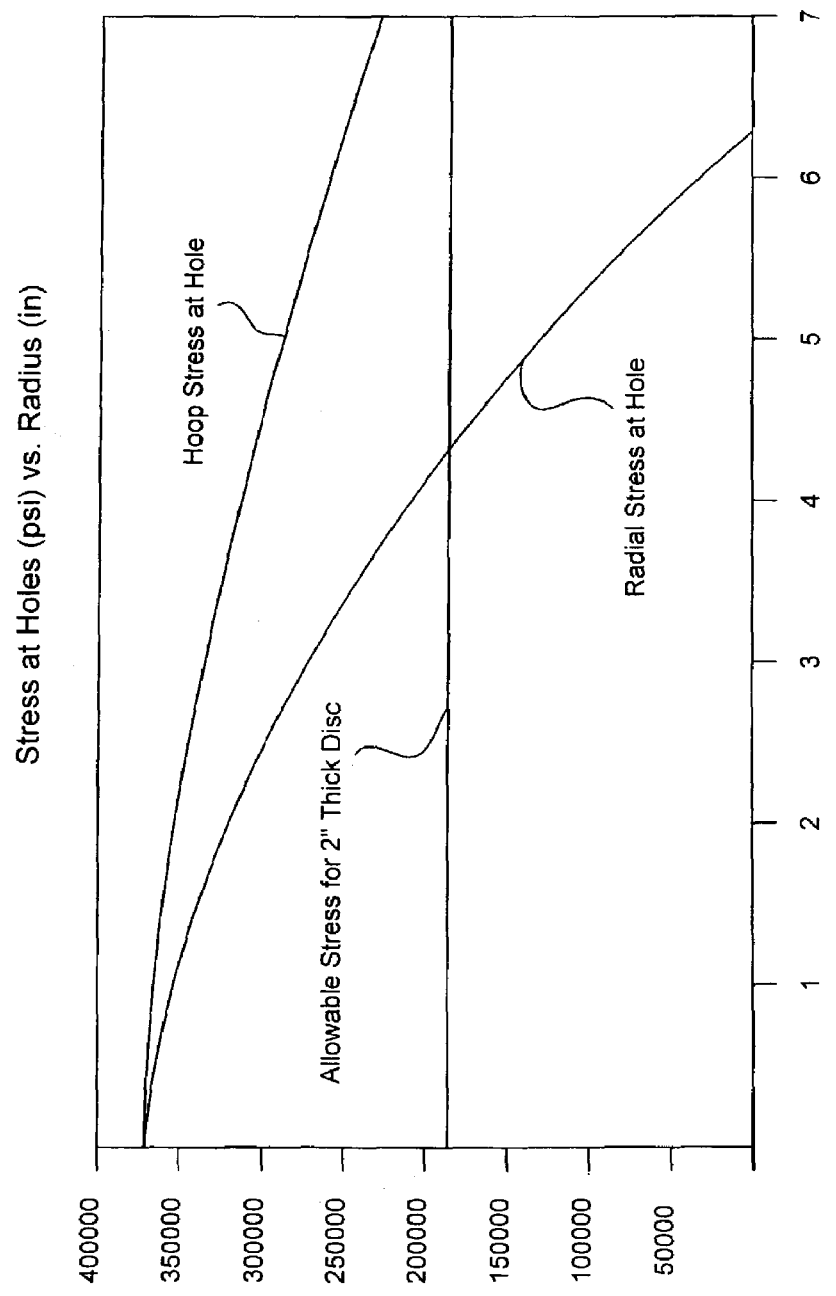
FIG. 10 is a graph showing radial and hoop stresses at a bolt hole versus bolt hole radial position for an axially stacked disc flywheel with axial bolts, not in accordance with the preferred embodiment of the invention.

To eliminate the need for a central hole, one possible method to assemble the discs would be to bolt them together, as shown in FIG. 9, in an axially stacked disc flywheel 60 with off-center axial bolts. The flywheel 60 is constructed of multiple discs 61 and in most cases, shafts 62. The discs 61 are held together using axial bolts 64 that pierce the discs at a certain radius. This design cannot achieve maximum speed and energy storage. As shown in FIG. 10, it can be seen that no matter what radius the axial through bolts are positioned, the hoop stress at the hole is significantly higher than the allowable stresses for the same disc flywheel. At the center, the bolt hole stresses are equal to the case of the central shaft as shown in FIG. 8. The hoop stress at a hole is equal to three times the hoop stress minus the radial stress at that location in the disc, if no holes was present. Likewise, the radial stress at a hole is equal to three times the radial stress minus the hoop stress at that location in the disc, if no hole was present.

Figure 11:
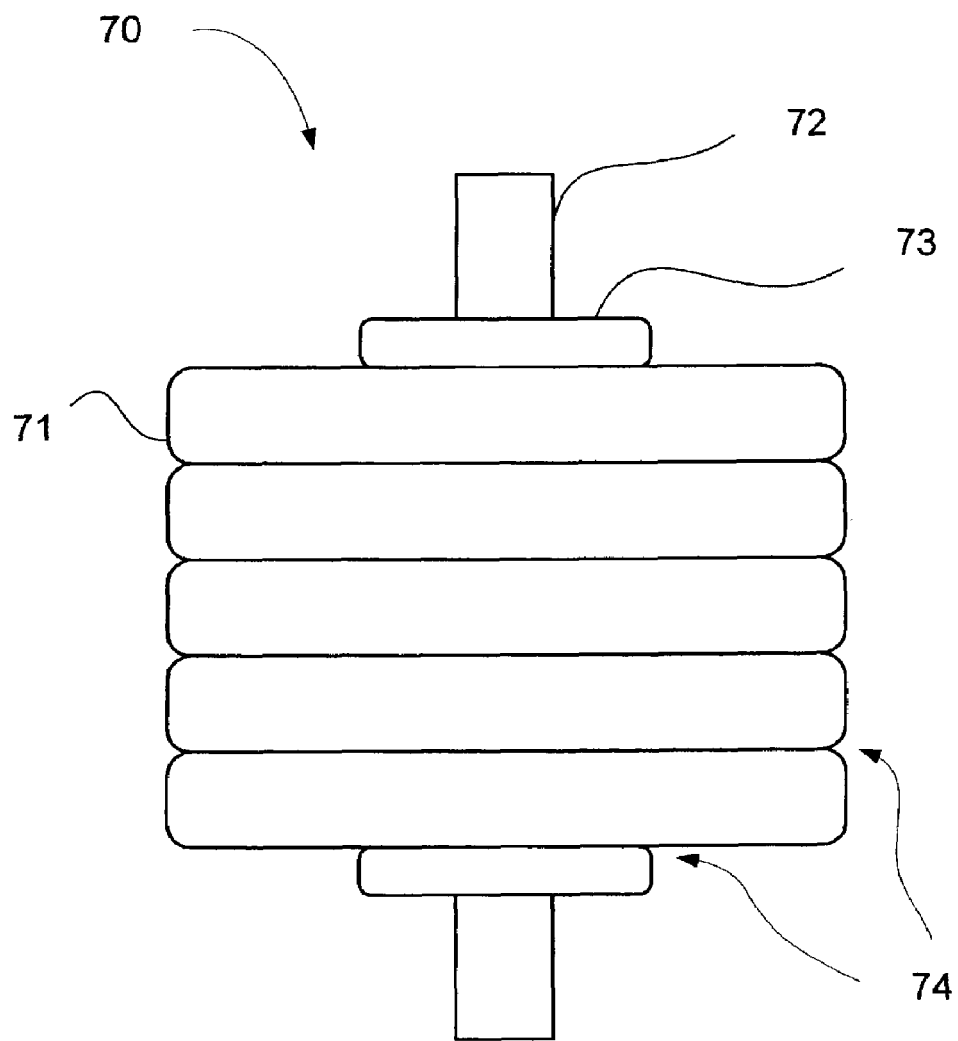
FIG. 11 is an elevation of an axially stacked disc flywheel in accordance with the invention.

The preferred embodiment of the flywheel of the invention achieves high operating speed and energy storage capability by axially stacking thinner steel discs and attaching them together without making through holes in the discs. One preferred configuration of the invention, shown in FIG. 11, is a flywheel 70 constructed of multiple discs 71 that are substantially flat over most of their diameter, and in most cases, shafts 72 and end plates 73. The discs 71 are preferably forged and rough machined to shape and heat treated to high hardness and tensile strength. The discs 71 are then stacked axially and joined at the outer diameter by welding, brazing or soldering. Other methods of joining could also be used, such as bonding. As shown, the discs 71 can have radiused or chamfered outer diameter corners 74 to facilitate the joining process by leaving room for the welding, brazing or soldering, but these discs 71 are no "constant stress" design discs. The radiused or chamfered outer diameter corners 74 also allows the outer diameter of the assembled flywheel 70 to be machined or ground to final dimension without unjoining the discs 71. If the outer diameter is not going to be ground, the corners can alternatively be left sharp. The shafts 72 could be directly attached to the upper and lower end discs 71. Alternatively, the end plates 73 could be bolted to the discs 71 as long as the discs 71 did not have through holes or holes with a depth significant to its axial thickness. Because the end plates 73 have a smaller diameter and experience much lower rotational stress, the use of through holes for bolts in the end plates 73 is acceptable.

The discs are preferably forged to the flat disc shape. Forging increases the toughness in the radial direction. If there is a failure in a disc caused by crack initiation in a flaw in the material, which is the most probable failure mode if there is a failure. The stacked disc configuration minimizes chances of catastrophic failure of the flywheel due to initiation of a crack in a single disc by restricting axial crack propagation to that single disc, and supporting the cracked disc by one or more adjacent discs until the flywheel can be safely decelerated.

Figure 12:
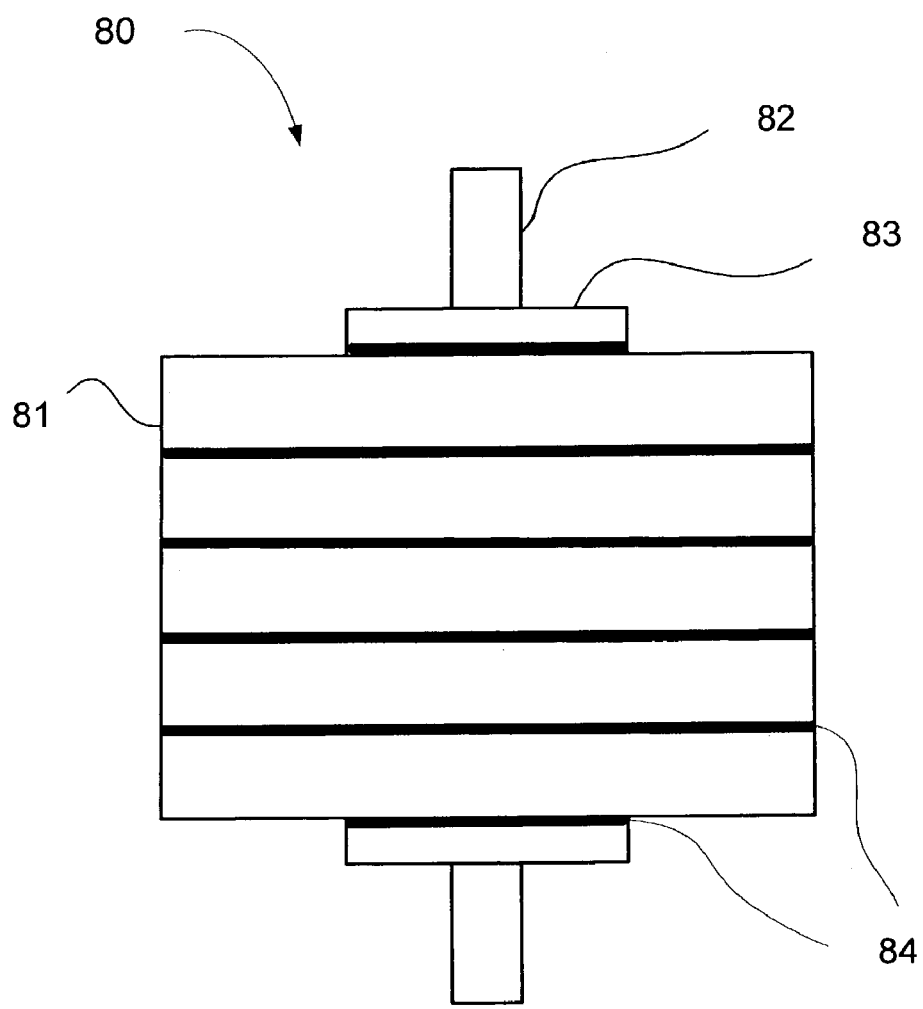
FIG. 12 is an elevation of an axially stacked disc flywheel with axial layer joining in accordance with the invention.

Another method of joining the discs is to put axial joining layers between the discs, as shown in FIG. 12, to produce an axially joined axially stacked disc flywheel 80. The flywheel 80 is constructed of multiple stacked discs 81 and in most cases, shafts 82 and end plates 83. In this configuration, the discs 81 are joined axially by preferably brazing, soldiering or use of an adhesive. Other methods of joining may also be used. A final machining or grinding can be accomplished if desired without separating the discs 81.

Figure 13:
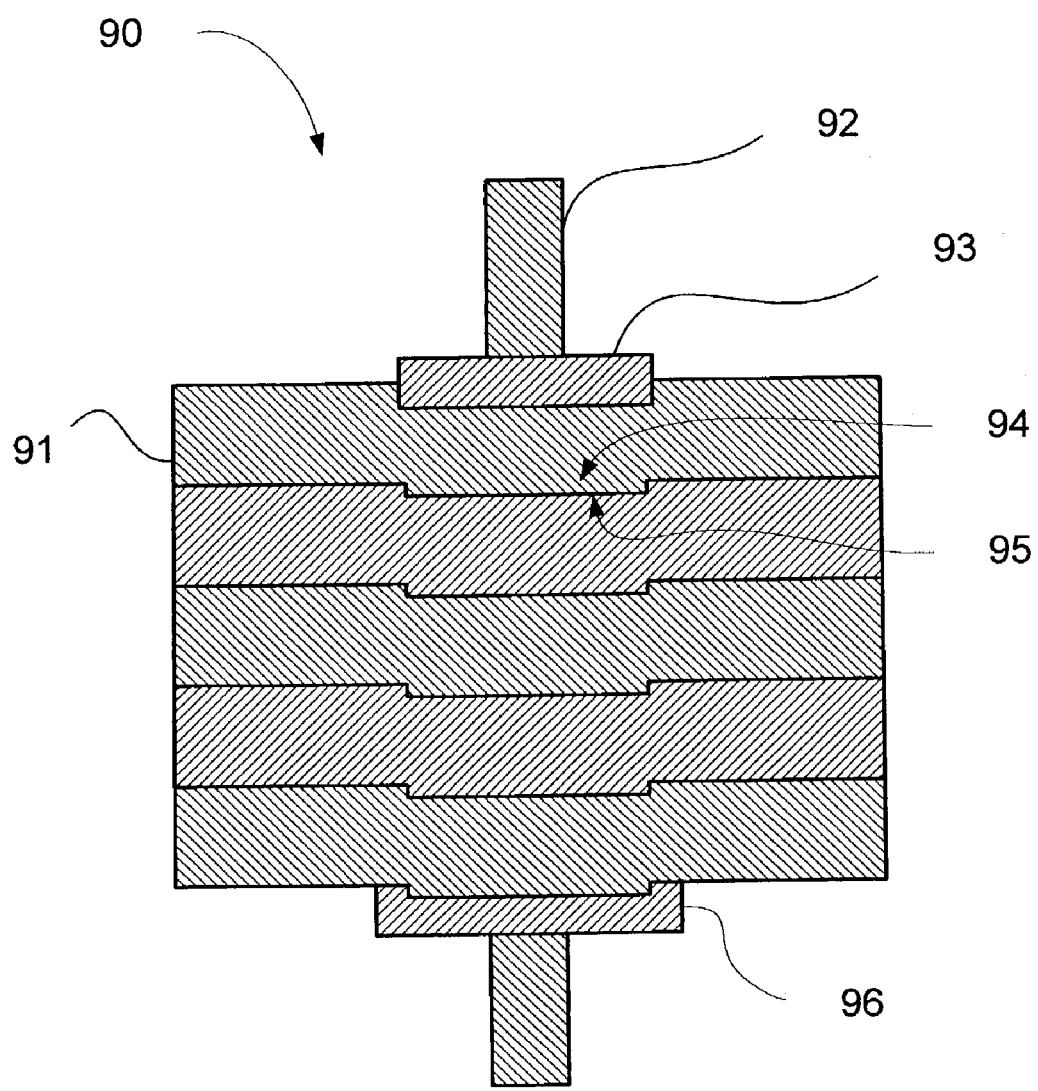
FIG. 13 is a sectional elevation of an axially stacked disc flywheel with interference assembly joining in accordance with the invention.

An interference assembled axially stacked disc flywheel 90 is shown in FIG. 13. The flywheel 90 is constructed of multiple discs 91 and in most cases, shafts 92 and end plates 93 and 96. In this configuration, protrusions 94 and recesses 95 in the axial surfaces of adjacent discs are assembled together. The protrusions 94 and intrusions 95 can be straight or tapered and the assembly can be done by axial force application or by a thermal shrink fit. The interference should be chosen to be high enough to keep the discs 91 connected at high speed. The hoop stress at the inner diameter of an intrusion should also not exceed the allowable stress. The intrusions 95 preferably are short compared to the axial thickness of the discs 91 and internal corners are also rounded so as to minimize stress concentrations. The machining of the intrusions 95 and protrusions 94 can occur before or after the heat treatment. Depending on the level of distortion from the heat treatment and in consideration of the interference fit tolerances, a final machining is likely necessary before assembly. It is also conceivable that the axial intrusions and protrusions could be connected together by other means including use of threads. This method would however be more costly. A strong adhesive such as epoxy could also be used, in which case the tempering of the discs 91 would be done prior to assembly of the discs into the flywheel 90. The epoxy would be trapped in the interior of the flywheel, so outgassing would be minimized.

Figure 14:
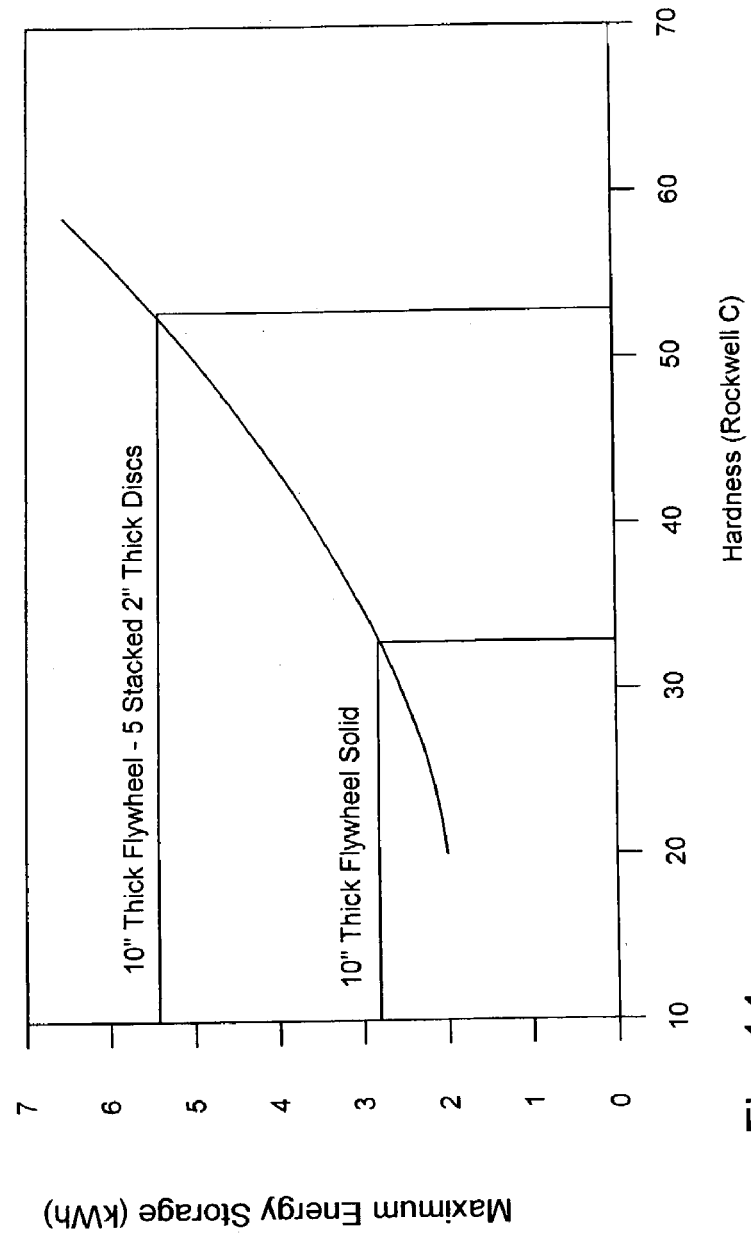
FIG. 14 is a graph showing flywheel energy storage capacity of an axial stacked disc flywheel in accordance with the invention versus steel hardness.

Two identical size flywheels (14 inch diameter and 10 inch thickness) but with different constructions are compared in the graph of flywheel energy storage capacity versus steel hardness shown in FIG. 14. One flywheel is of conventional unitary construction as a solid thick cylinder. Because of its construction, it only achieves a steel hardness of 32 ARC and stress allowable of 97 ksi in the flywheel center. At its maximum allowable speed, the flywheel rotates at 25.0 krpm (465 m/sec) and stores 2.84 kWh of energy. The second flywheel uses the preferred construction of the invention and is constructed in this case of 5 axially stacked 2 inch thick discs. The discs achieve a hardness of 52 HRC and stress allowable of 183 ksi throughout the flywheel. This assumes a factor of safety of 1.5 based on the tensile strength. As mentioned previously, consideration of the actual fatigue service life and the steel used may dictate choosing different final tempered hardness. At its maximum allowable speed, the flywheel rotates at 34.3 krpm (640 m/sec) and stores 5.36 kWh of energy. The use of the invention allows for an increase in the flywheel allowable rotation speed of 37% and this corresponds to an increase in stored energy of approximately 89%. The flywheel of the invention is particularly well suited for storing energy in excess of 10 kilowatts and up to multiple megawatts.

Figure 15:
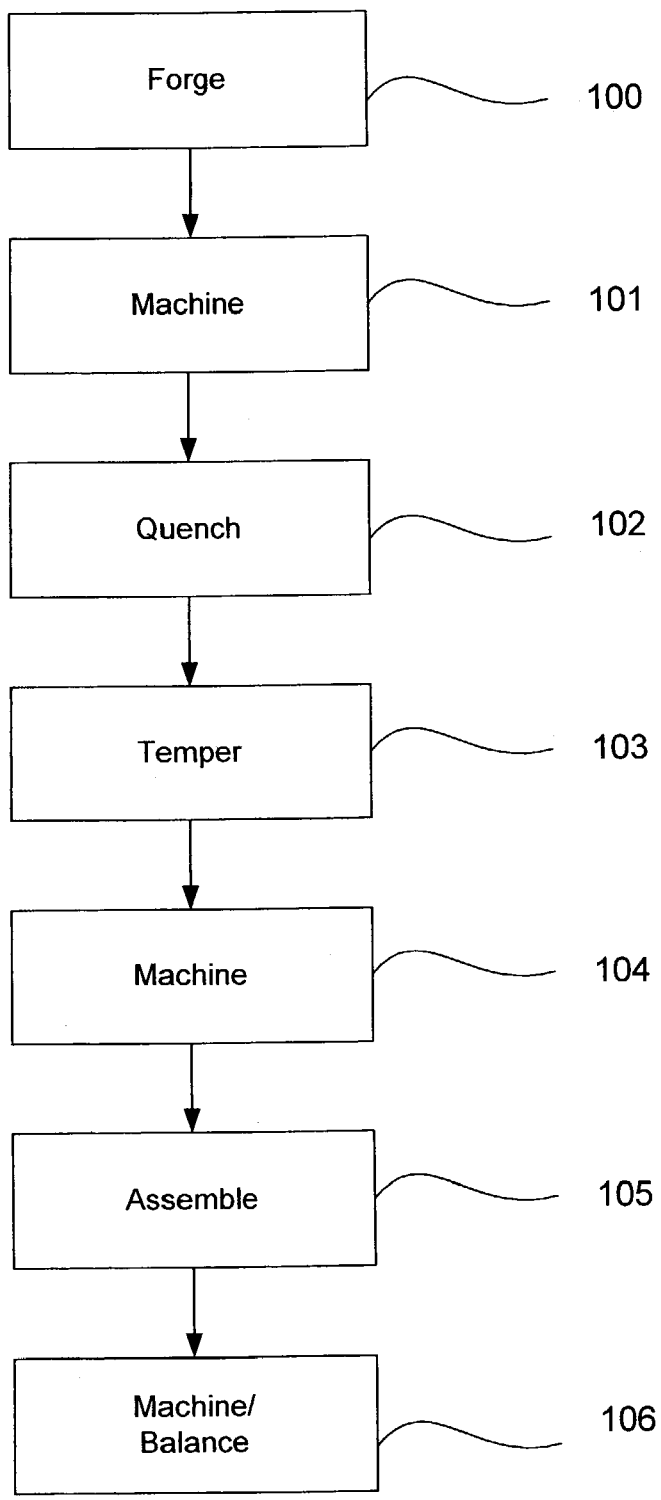
FIG. 15 is a process flow diagram for fabrication of an axially stacked disc flywheel in accordance with the invention.

As shown in FIG. 15, the process for manufacturing flywheels in accordance with the invention involves assembling already individually hardened steel discs. The manufacturing process preferably consists of fabricating the steel discs by forging at 100. Although other methods such as rolled steel could be used, forging provides the most sound center and axial direction forging of discs results in grain flow in the radial and hoop direction. This provides increased toughness in these directions, which are also the directions of greatest stress. The thickness of the discs is preferably chosen to allow substantially full hardening for the best properties in the final flywheel. One method to choose the axial disc thickness is to make it less than twice the ideal critical diameter for the steel used. The ideal critical diameter is the maximum diameter of a long cylinder that can be fully hardened. An approximation of this value can be calculated using procedure ASTM A-255 using the listed alloy multiplying factors. For many common steels, this results in axial disc thicknesses between ¼ inch and 6 inches.

After forging, the discs are preferably rough machined at 101 to eliminate any seams that might crack the discs during heat treatment. The discs are then heated and quenched at 102 to develop an internal martensite structure. Quenching conditions differ for different types of steel based on their alloy compositions and the quenching step 102 illustrated can be any heat treatment that promotes the high strength. The discs are then tempered at 103 to increase their toughness and reduce residual stresses. It is conceivable that tempering could be done after assembly. However, tempering directly alter quenching is usually best to prevent any cracking since the steel is brittle especially after a full hardening quench. The discs are machined at 104 again to eliminate distortion from the heat treatment for flatness and in some cases to provide features such as axial recesses and protrusions for assembly as shown in FIG. 13. The discs are then assembled at 105 to produce the flywheel. A final machining and or balancing at 106 can be done if required. For safety and for allowing the highest possible operating speed, the discs can be nondestructively evaluated after quenching and tempering to prevent use of any discs having flaws larger than a limited flaw size. The flaws are preferably less than ⅛ inch, which is a size that is readily detectable. Besides the great increase in strength afforded by use of the invention, fabrication by multiple stacked discs could allow lower costs by allowing individual flawed discs to be identified by nondestructive evaluation and not used in the flywheel thus preventing waste of a complete large flywheel. Ultrasonic or X-ray NDE could also be applied to the fully assembled flywheel. This would allow checking of the axial connections but it may be harder to check for internal material flaws at this point, depending on the design.

Figure 16:
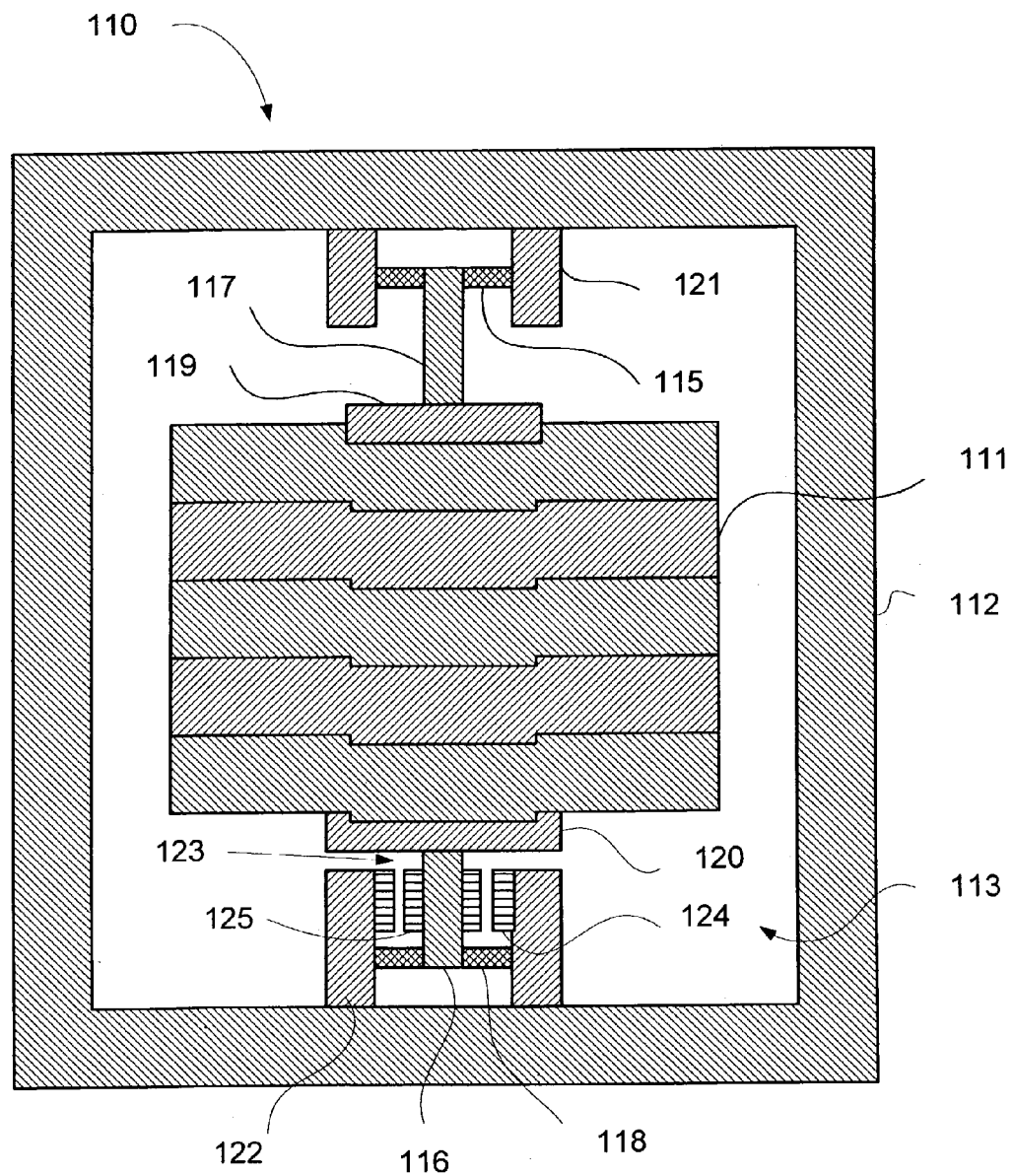
FIG. 16 is a schematic sectional elevation of a flywheel energy storage system with axially stacked disc flywheel in accordance with the invention.

A flywheel energy storage system in accordance with the invention with axially stacked dick flywheel is shown in FIG. 16. The flywheel system 110 is comprised of a steel flywheel 111 fabricated from assembled individual discs 114. The flywheel 111 rotates inside an evacuated chamber 113 in a container 112 for the reduction of aerodynamic drag. Flywheel systems operating at lower speeds could use a helium atmosphere instead. The flywheel 111 has shafts 117 and 116 that are attached using end plates 119 and 120. The shafts 116, 117 are supported for rotation using upper and lower bearings 115 and 118 that are connected to support mounts 121 and 122. As shown, the flywheel 111 rotates about a vertical axis, however rotation about other axes is also possible. The flywheel 111 is accelerated and decelerated for storing and retrieving energy using a motor/generator 123. The motor/generator 123 has a rotor 125 attached to the flywheel shaft 116; the rotor 125 cooperates with a stator 124 attached to the support mount 122. Although the motor/generator 123 shown is combined, a separate motor and generator could alternatively be used. It is also conceivable that the flywheel 111 itself could function as the rotor 125 for the motor/generator 123. In this case, the flywheel discs could have features on their other diameter such as protrusions to facilitate energy conversion. The joining of the discs axially could also be done to reduce magnetic losses by discs by axial joining using electrically insulating layers at least at the outer diameter.

Many possible configurations along with combinations of the listed configurations of the invention for joining the flywheel discs without piercing through holes exist. They are too numerous to list completely. Although shown with 2-inch thick 4340 steel discs, many types of steel could be used along with disc thicknesses and heat treatments. Steels with higher hardenability could allow for use of thicker discs while still achieving the same performance. Likewise, very low cost, low hardenability carbon steels could also be used by stacking more axially thinner discs. In all configurations of the invention, the flywheel can be of round or of irregular shape. In most cases, round discs offer the best performance and the lowest manufacturing cost.

Obviously, numerous modifications and variations of the preferred embodiment described above are possible and will become apparent to those skilled in the art in light of this specification. For example, many features, functions and advantages are described for the preferred embodiment, but in some uses of the invention, not all of these functions and advantages would be needed. Therefore, I contemplate the use of the invention using fewer than the complete set of noted features, functions and advantages. Moreover, several species and embodiments of the invention are disclosed herein, but not all may be specifically claimed, although all are covered by generic claims. Nevertheless, it is my intention that each and every one of these species and embodiments, and the equivalents thereof, be encompassed and protected within the scope of the following claims, and no dedication to the public is intended by virtue of the lack of claims specific to any individual species. Accordingly, it is expressly intended that all these embodiments, species, modifications and variations, and the equivalents thereof, are to be considered within the spirit and scope of the invention as defined in the following claims, wherein

I claim:

1. A flywheel for an energy storage system comprised of a low pressure housing, a flywheel supported for rotation in said housing on a bearing system, and a motor and generator for accelerating and decelerating said flywheel for storing and retrieving energy, said flywheel comprising:
   an axial stack of a plurality of steel discs connected together, said discs being free of axial through holes;
   said discs being quenched for strength prior to assembly of said flywheel, and tempered for toughness;
   adjacent discs in said stack having axial faces abutting each other across the entire surface thereof to create a substantially solid unitary flywheel cylinder when assembled from said discs.

2. A flywheel as described in claim 1 wherein:
   said discs are constructed from alloy steel with center properties of radial tensile yield strength greater than 120 ksi and radial plane strain fracture toughness greater than 80 Ksi(in)^½.

3. A flywheel as described in claim 2 wherein:
   said steel discs have a diameter equal to a desired outer diameter of said flywheel, and have an axial direction thickness less than 6 inches.

4. A flywheel as described in claim 3 wherein:
   said steel discs have an axial thickness greater than ¼ inch.

5. A flywheel as described in claim 2 wherein:
   said steel discs have a diameter equal to a desired diameter of said flywheel, and have an axial thickness less than twice the ideal critical diameter of said steel, as calculated using the multiplying factors of ASTM A-255.

6. A flywheel as described in claim 2 wherein:
   said flywheel stores an amount of energy in fully charged operation that is greater than 10 kilowatt-hours.

7. A flywheel as defined in claim 1, wherein said discs each have a substantially uniform axial thickness throughout.

8. A flywheel as described in claim 7 wherein:
   said discs are heat treated to have a tensile yield strength greater than 120 ksi and a plane strain fracture toughness greater than 80 ksi(in)^½.

9. A flywheel as described in claim 1 wherein:
   said steel discs are attached to each other by a process selected from the group consisting of soldering, brazing, welding, and bonding.

10. A flywheel as described in claim 1 wherein:
    said flywheel has an axial cylinder length greater than its diameter.

11. A flywheel as described in claim 1 wherein:
    said steel has a nickel content greater than 1.0%.

12. A flywheel as described in claim 1 wherein:
    said steel discs are attached to each other by a first disk of two adjacent discs having an axial protrusion, the second disk having an axial recess, wherein said protrusion of said first disk fits inside said recess of said second disk.

13. A flywheel as described in claim 12 wherein:
    said protrusion on said first disk is an interference fit inside said recess of said second disk.

14. A flywheel energy storage system having a flywheel supported for rotation on a bearing system inside a low pressure housing, said flywheel having an attached motor and generator for accelerating and decelerating said flywheel for storing and retrieving energy, said flywheel comprising:
    multiple axially stacked steel discs, said discs being free of axial through holes and having an outside diameter equal to a desired outside diameter of said flywheel;
    said discs are axially connected at a diameter that is greater than 80% of said outside diameter of said flywheel.

15. A flywheel energy storage system as described in claim 14 wherein:
    said flywheel has an bending moment of inertia, Ixx measured in (inches$^4$), and diameter measured in (inches), such that Ixx>0.02 d$^4$.

16. A flywheel energy storage system as described in claim 14 wherein:
    said steel discs are quenched and tempered prior to use in high speed rotation, said quenching being done prior to assembly of said discs into said flywheel.

17. A flywheel energy storage system as described in claim 14 wherein:
    said flywheel functions as a rotor portion of said generator, and radially outer portions of said discs are separated by electrically insulating layers.

18. A process of manufacturing a flywheel for an energy storage flywheel system comprising:
    fabricating multiple steel discs, free of axial through holes, with diameters roughly equivalent to a desired outer diameter of said flywheel;
    quenching and tempering said discs to a desired hardness and toughness;

assembling said discs with diameters roughly equivalent to said maximum outer diameter of said flywheel by joining said discs axially while maintaining said disc free of through holes, said assembling including establishing contact between adjacent discs to at least 80% of said diameters of said discs to provide a bending moment of inertia and hence bending stiffness at least about 40% of the bending stiffness that would obtain if said discs were in contact all the way to said outer diameter of said discs.

19. A process as described in claim 18 wherein:

said multiple steel discs are fabricated by forging.

20. A process as described in claim 18 wherein:

said discs are nondestructively evaluated prior to assembly.

21. A process as described in claim 20 wherein:

said nondestructive evaluation insures that said discs are free of flaws that are greater than ⅛ inch.

22. A process of storing and retrieving energy, comprising:

supporting a flywheel having two or more solid steel discs free of through holes and rigidly joined together axially on a bearing system for rotation inside a container that is maintained at a low pressure said solid steel discs having been quenched and tempered prior to joining said discs together;

spinning said flywheel to high speed with an electric motor, thereby storing input energy as mechanical energy in the form of rotational inertia;

driving a generator with said flywheel to convert said stored input energy back into electrical energy, thereby retrieving said stored energy from said flywheel.

23. A process as described in claim 22, further comprising:

minimizing chances of catastrophic failure of said flywheel due to initiation of a crack in a single disc by restricting axial crack propagation to said single disc, and supporting said cracked disc by one or more adjacent discs until said flywheel can be safely decelerated.

* * * * *